United States Patent [19]
Chen

[11] Patent Number: 5,813,107
[45] Date of Patent: Sep. 29, 1998

[54] METHOD FOR MAKING A MAINTUBE OF A TELESCOPE

[75] Inventor: Chiu Jong Chen, Taichung, Taiwan

[73] Assignee: Panwell Metal Co., Ltd., Taichung, Taiwan

[21] Appl. No.: 636,577

[22] Filed: Apr. 23, 1996

[51] Int. Cl.⁶ ..................................................... B23P 13/04
[52] U.S. Cl. ................................ 29/557; 33/245; 72/370
[58] Field of Search ....................... 29/557, 558; 33/245, 33/252; 72/316, 318, 370

[56] References Cited

U.S. PATENT DOCUMENTS

| | | | |
|---|---|---|---|
| 1,647,447 | 11/1927 | Hartnett | 29/512 |
| 2,357,110 | 8/1944 | Heineman | 72/370 |
| 3,696,516 | 10/1972 | Thompson | 33/245 |
| 4,211,103 | 7/1980 | Grimaldo | 72/316 |
| 4,982,502 | 1/1991 | Weyrauch | 33/245 |

*Primary Examiner*—David P. Bryant

[57] ABSTRACT

A method manufactures an integral maintube of a telescope from a shaft. One end of the shaft is first machined to form a cylindrical member and the other end of the shaft is secured in a mold device. One or more tools are used for gradually enlarging the cylindrical member into a cone member. The other end of the shaft is then machined so as to form a cubic member in the middle portion. An upper mold includes a mold cavity corresponding to that of the cone member and is engaged around the cylindrical member so as to form the cone member.

4 Claims, 4 Drawing Sheets

METHOD FOR MAKING A MAINTUBE OF A TELESCOPE

BACKGROUND OF THE INVENTION

1. Field of the Invention

The present invention relates to a method, and more particularly to a method for making a maintube of a telescope.

2. Description of the Prior Art

A typical telescope is shown in FIGS. 9 and 10 and comprises a front tube 60 having an enlarged cone 61 formed in the front portion thereof and having an outer thread 62 formed in the rear portion thereof, and comprises a rear tube 63 having an inner thread 64 formed in the front portion for threadedly engaging with the outer thread 62 of the front tube 60 so as to be secured to the front tube 60. The rear tube 63 includes a substantially cubic member 65 formed in the front portion and includes an outer thread 66 (FIG. 9) formed in the rear portion for engaging with an eyepiece 67 (FIG. 10). A control ferrule 68 is engaged on the rear tube 63 and secured to the eyepiece 67 for rotating and for adjusting the eyepiece 67. A number of lenses are arranged within the tubes 60, 63 respectively before the tubes 60, 63 are secured together, so as to form the telescope. The tubes 60, 63 are required to be accurately aligned. However, the tubes 60, 63 are secured together by the thread engagement such that it will be very difficult to have the tubes 60, 63 accurately aligned. The reason why the typical tubes 60, 63 may not be made integrally is that the cubic member 65 should be formed in between the tubes 60, 63.

The present invention has arisen to mitigate and/or obviate the afore-described disadvantages of the conventional methods for manufacturing the maintube of the telescopes.

SUMMARY OF THE INVENTION

The primary objective of the present invention is to provide a method which may manufacture an integral maintube for the telescope.

In accordance with one aspect of the invention, there is provided a method for manufacturing a maintube of a telescope, the maintube including a first end having a cone member formed therein and including a middle portion having a cubic member formed therein and including a second end having an outer thread formed thereon, the method comprises preparing a shaft having a hole formed therein, the shaft including a first end and a second end and a middle portion, machining the first end of the shaft into a cylindrical member, holding the second end of the shaft, forging the cylindrical member into the cone member, and machining the shaft so as to form the cubic member in the middle portion of the shaft and so as to form the outer thread on the second end of the shaft. The cone member and the cubic member and the maintube include an integral configuration.

The forging process includes at least two tools for gradually enlarging the cylindrical member step by step so as to form the cone member.

The forging process includes a lower mold having a first mold cavity for receiving and for holding the second end of the shaft, and includes an upper mold engaged on the lower mold, the upper mold includes a second mold cavity formed therein having a shape corresponding to that of the cone member for forming the cone member.

The shaft is first heated to a temperature ranging from 325° C. to 375° C. so as to be softened before the cylindrical member is formed.

The maintube is further heated to a temperature ranging from 500° C. to 540° C. and maintained in this temperature for about two hours, and is then cooled, the maintube is then heated again to a temperature ranging from 180° C. to 220° C. and maintained in this temperature for about three to four hours.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
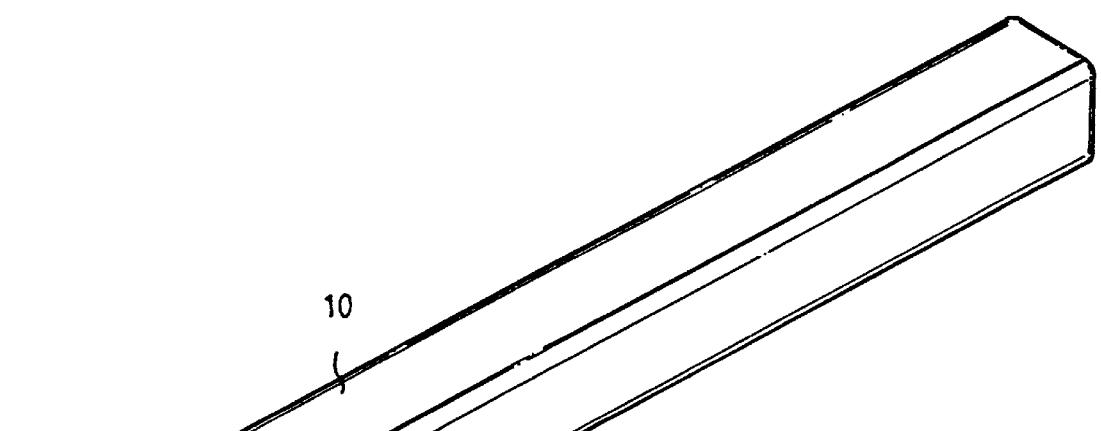
FIGS. 1, 2 and 3 are perspective views for illustrating the processes of a method in accordance with the present invention.
Figure 2:
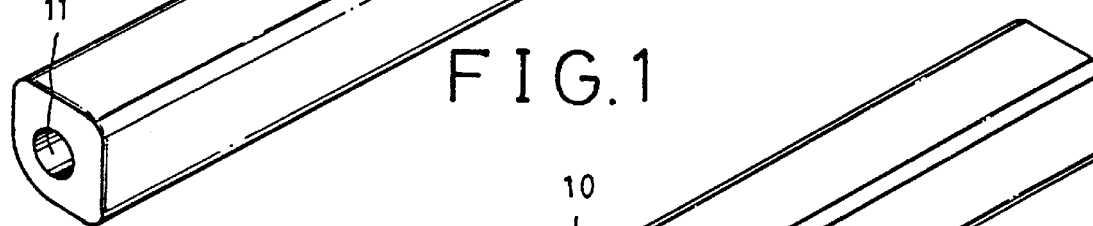
Figure 3:
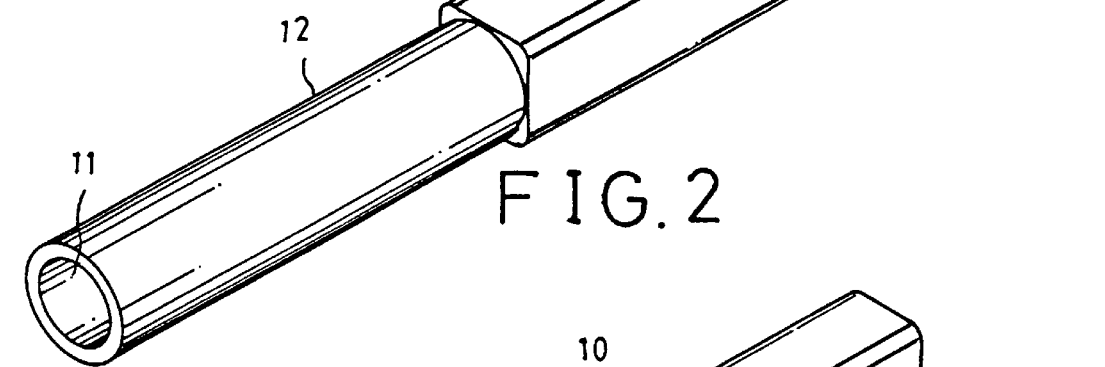

Referring to the drawings, and initially to FIGS. 1 to 3, a method in accordance with the present invention is provided for manufacturing an integral maintube of a telescope from a shaft 10. The shaft 10 comprises a hole 11 formed therein and comprises a substantially square cross section (FIG. 1). One end of the shaft 10 is first machined to a cylindrical member 12 (FIG. 2) and is then forged to a cone member 14 (FIG. 3). The shaft 10 usually includes a hardness of about RH25. Before the shaft 10 is machined to form the cylindrical member 12, it is preferable that the shaft 10 is first heated to a temperature ranging from 325° C. to 375° C. so as to be softened to a hardness ranging from RH0 to RH5.

Figure 6:
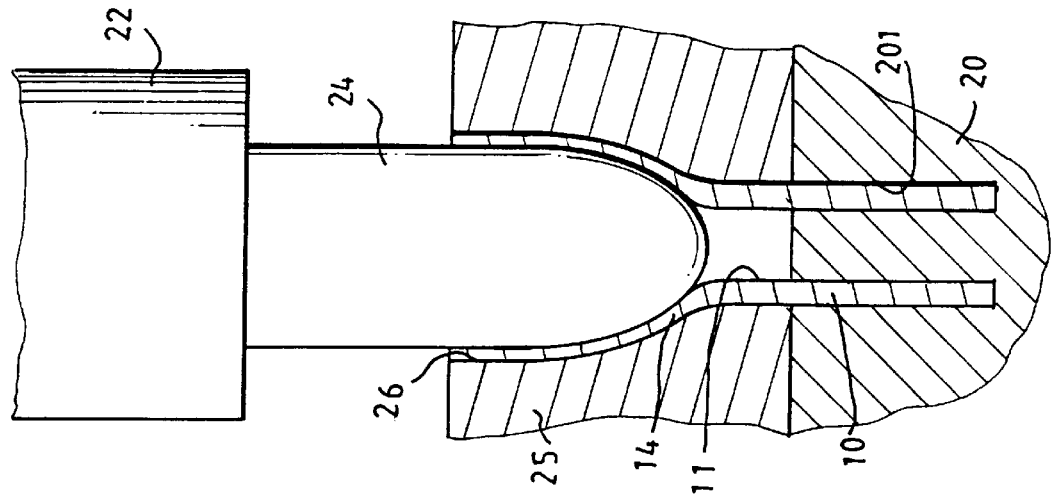
FIGS. 4, 5, 6 are cross sectional views for illustrating the formation of the cone member.
Figure 5:
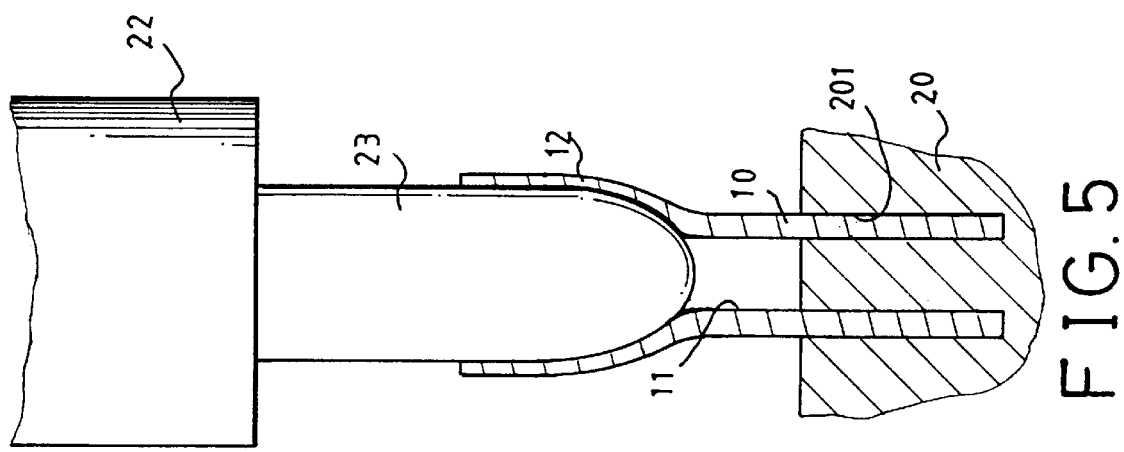
Figure 4:
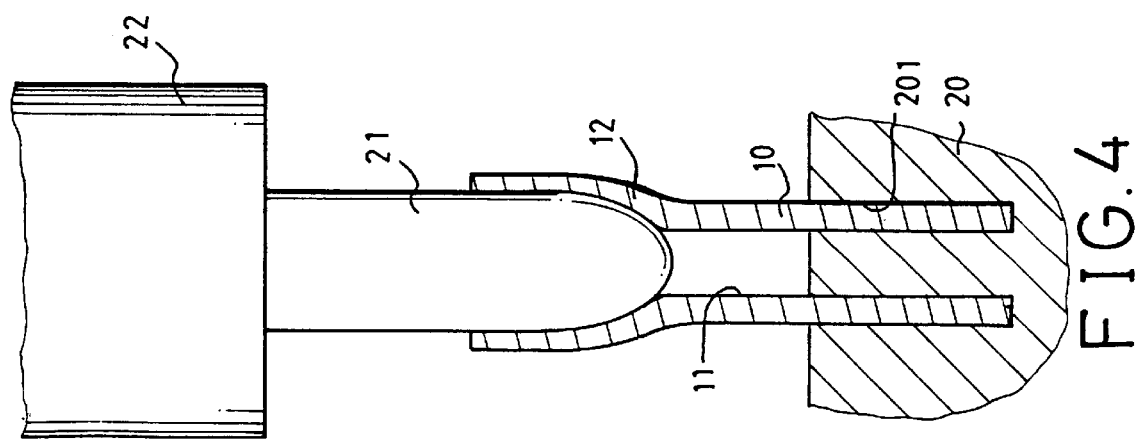

Referring next to FIGS. 4 to 6, illustrated are the processes for forming the cone member 14. The lower end of the shaft 10 is received and retained in a mold cavity 201 of a lower mold 20. The cylindrical member 12 is extended upward beyond the lower mold 20. A first tool 21 (FIG. 4) is secured to an actuator 22 so as to be moved up and down by the actuator 22 and so as to be engaged in the hole 11 of the shaft 10. The first tool 21 includes an outer diameter slightly larger than the inner diameter of the cylindrical member 12 so as to enlarge the cylindrical member 12. A second tool 23 (FIG. 5) has an outer diameter slightly larger than that of the first tool 21 so as to further enlarge the cylindrical member 12. As shown in FIG. 6, a third tool 24 has an outer diameter slightly larger than that of the second tool 23 so as to further enlarge the cylindrical member 12 into the cone member 14. An upper mold 25 is preferably provided around the cylindrical member 12 and/or the cone member 14 and has a mold cavity 26 corresponding to the shape of the cone member 14 such that the cone member 14 may be perfectly and accurately formed.

For example, the cylindrical member 12 includes an inner diameter of 23 mm and an outer diameter of 32 mm at the beginning. The first tool 21 may enlarge the cylindrical member 12 to an inner diameter of 33 mm and an outer diameter of 41 mm. The enlarged rate is about 50%. The second tool 23 may enlarge the cylindrical member 12 to an inner diameter of 38 mm and an outer diameter of 46 mm. The enlarged rate is about 25%. The third tool 24 may enlarge the cylindrical member 12 to an inner diameter of 43 mm and an outer diameter of 51 mm. The enlarged rate is about 25%. At this moment, the hardness of the cone member 14 is greater than that of the shaft 10.

After the cone member 14 is formed, the shaft 10 is heated again and heated to a temperature ranging from 500° C. to 540° C. and maintained in this temperature for about two hours, and is then cooled by water. After the shaft 10 has been cooled down, the shaft 10 is heated again to a temperature ranging from 180° C. to 220° C. and maintained in this temperature for about three to four hours, and is then cooled naturally under environmental condition. The hardness of both the shaft 10 and the cone member 14 may then be hardened to an identical hardness of about RH70 to RH73. It is to be noted that the identical hardness of both the shaft 10 and the cone member 14 may facilitate a later coloring process.

Figure 7:
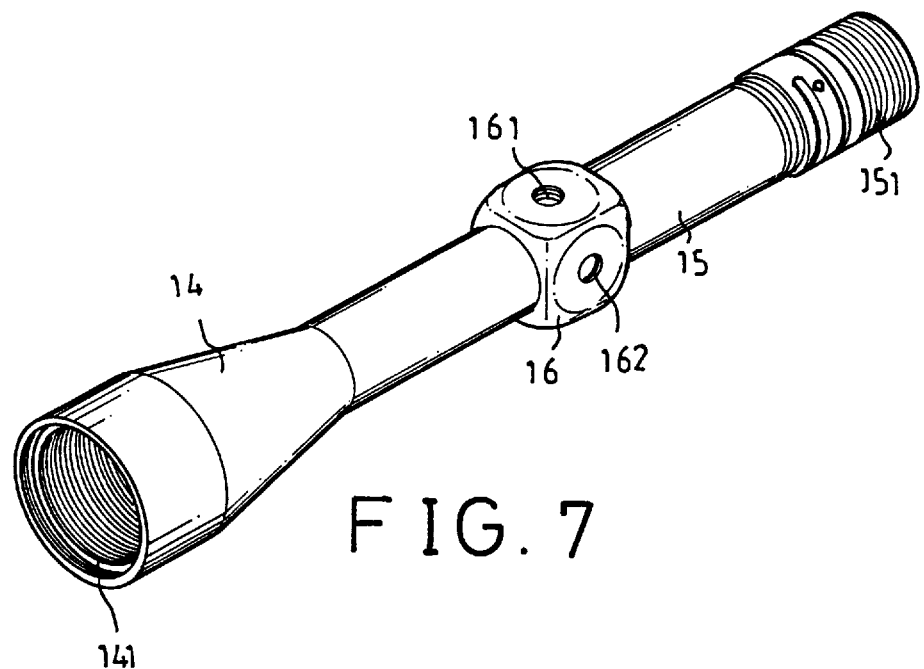
FIGS. 7, 8 are perspective views illustrating the maintube and the telescope respectively.
Figure 8:
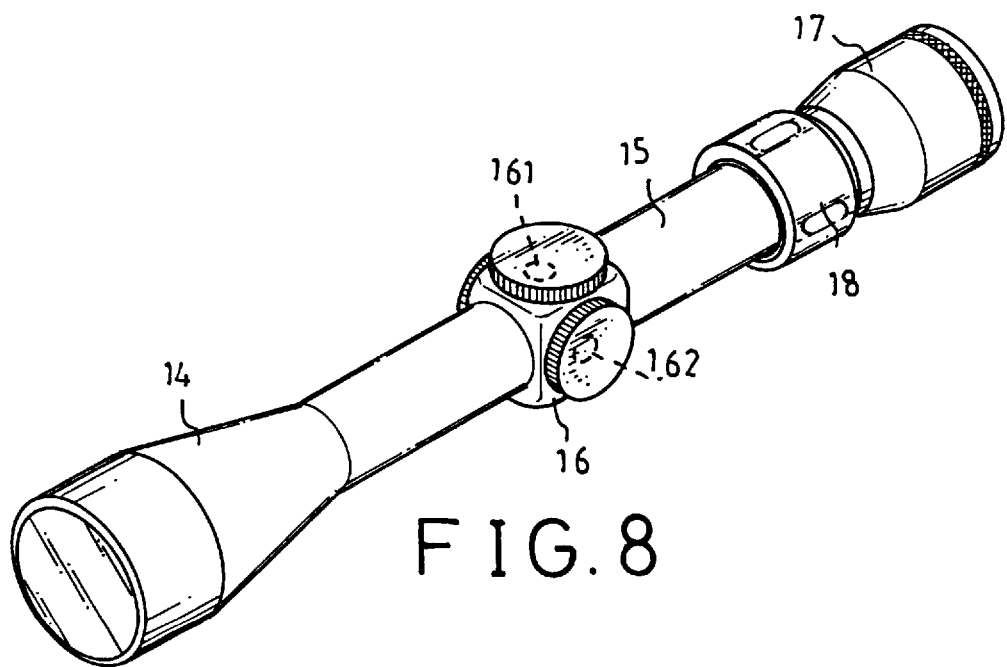
Figure 9:
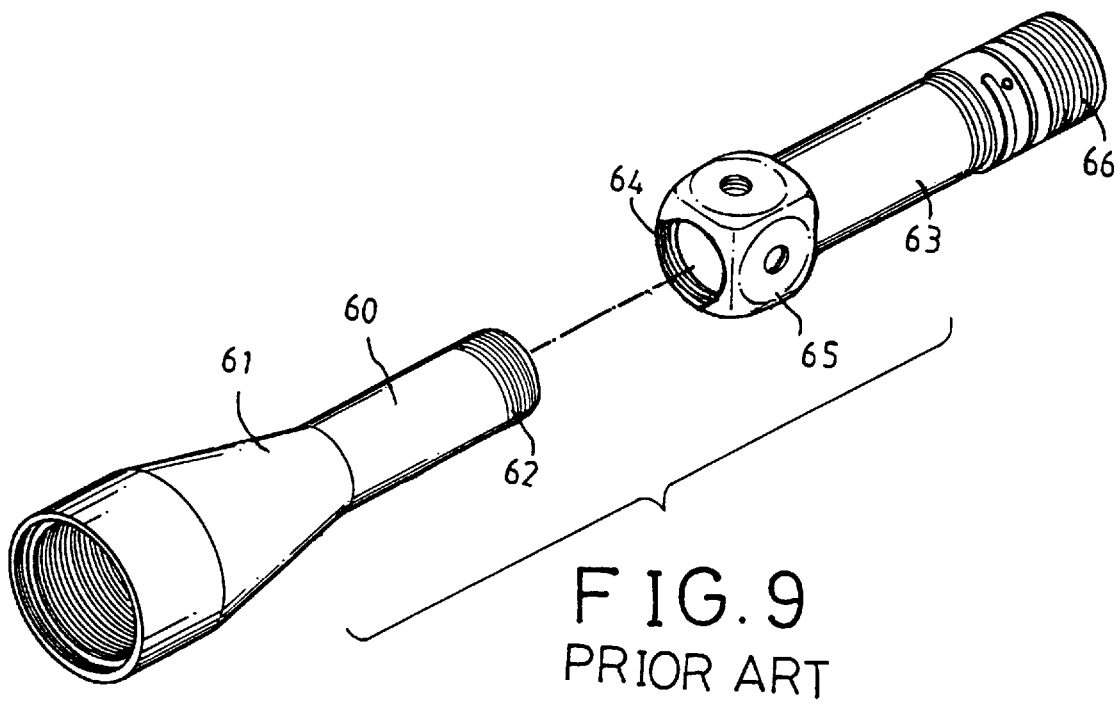
FIG. 9 is an exploded view of the maintube of the typical telescope.
Figure 10:
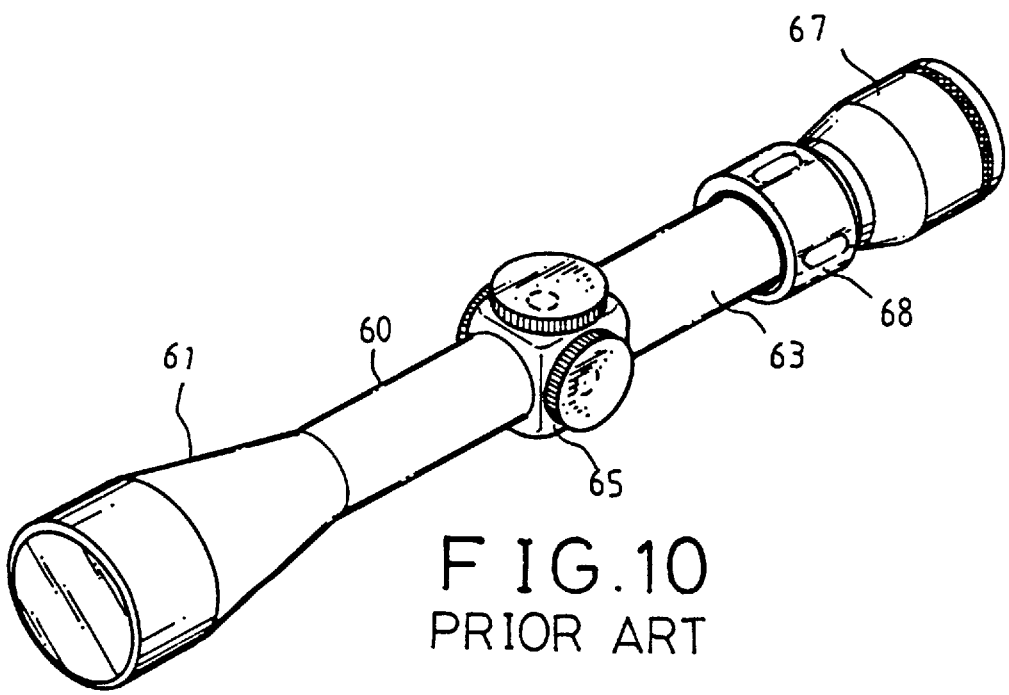
FIG. 10 is perspective view of the typical telescope.

Referring next to FIGS. 7 and 8, the shaft 10 is then required to be machined by typical machining process so as to form a maintube 15 and so as to form a cubic member 16 in the middle portion of the maintube 15. Inner threads 141, 161, 162 are then required to be formed in the cone member 14 and the cubic member 16 and an outer thread 151 is required to be formed in one end of the maintube 15. The coloring process and the machining processes are not related to the present invention and will not be described in further details.

It is to be noted that the cubic member 16 is required to form in the middle portion of the maintube 15 and that the cone member 14 includes an outer diameter greater than that of the maintube 15, such that the maintube 15 can only be manufactured into two separate tubes by the typical manufacturing method. The present invention is provided to manufacture the maintube 15 as an integral configuration.

Accordingly, the method in accordance with the present invention is provided for manufacturing an integral maintube of the telescope instead of manufacturing two tubes for assembling into the maintube.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A method for manufacturing a maintube of a telescope, said maintube including a first end having a cone member formed therein and including a middle portion having a cubic member formed therein and including a second end having an outer thread formed thereon, said method comprising:

preparing a shaft having a hole formed therein, said shaft including a first end and a second end and a middle portion, machining said first end of said shaft into a cylindrical member, holding said second end of said shaft, forging said cylindrical member into said cone member, and machining said shaft so as to form said cubic member in said middle portion of said shaft, said cone member and said cubic member and said maintube including an integral configuration.

2. A method according to claim 1, wherein said forging process comprises gradually enlarging said cylindrical member using at least two tools to form said cone member.

3. A method according to claim 1, wherein said shaft is first heated to a temperature ranging from 325° C. to 375° C. so as to be softened before said cylindrical member is formed.

4. A method according to claim 3, wherein said maintube is further heated to a temperature ranging from 500° C. to 540° C. and maintained in this temperature for about two hours, and is then cooled, said maintube is then heated again to a temperature ranging from 180° C. to 220° C. and maintained in this temperature for about three to four hours.

* * * * *